(12) United States Patent
Herickhoff et al.

(10) Patent No.: US 11,166,455 B2
(45) Date of Patent: Nov. 9, 2021

(54) SYSTEMS AND METHODS FOR AUTOMATING PHASE TRANSITIONS OF BIOLOGICAL MATERIALS

(71) Applicant: Membrane Protective Technologies, Inc., Fort Collins, CO (US)

(72) Inventors: Lisa A. Herickhoff, Fort Collins, CO (US); Myles J. Shepherd, Nunn, CO (US); Raul Gonzalez-Castro, Fort Collins, CO (US); Robert F. Anders, Fort Collins, CO (US); James A. Herickhoff, Fort Collins, CO (US)

(73) Assignee: Membrane Protective Technologies, Inc., Fort Collins, CO (US)

( * ) Notice: Subject to any disclaimer, the term of this patent is extended or adjusted under 35 U.S.C. 154(b) by 0 days.

(21) Appl. No.: 17/111,030

(22) Filed: Dec. 3, 2020

(65) Prior Publication Data

US 2021/0161127 A1    Jun. 3, 2021

Related U.S. Application Data

(60) Provisional application No. 62/942,830, filed on Dec. 3, 2019.

(51) Int. Cl.
*A01N 1/02*    (2006.01)

(52) U.S. Cl.
CPC ......... *A01N 1/0284* (2013.01); *A01N 1/0221* (2013.01); *A01N 1/0268* (2013.01); *A01N 1/0273* (2013.01)

(58) Field of Classification Search
CPC .. A01N 1/0284; A01N 1/0273; A01N 1/0268; A01N 1/0221; A01N 1/263; B01L 3/502715; B01L 7/50; B01L 7/52; B01L 2200/027; B01L 2300/044; B01L 2300/047; B01L 2300/0672; B01L 2300/0816; B01L 2300/0887; B01L 2400/0406; B01L 2400/0481; B01L 2400/0677; B01L 2400/0694; B01L 2400/086; B01L 2400/027; B01L 2400/0683; G01N 33/5005
See application file for complete search history.

(56) References Cited

U.S. PATENT DOCUMENTS

| | | | | |
|---|---|---|---|---|
| 4,712,607 A | * | 12/1987 | Lindemans | A01N 1/02 165/263 |
| 5,004,681 A | * | 4/1991 | Boyse | A61K 35/28 435/2 |
| 5,205,128 A | * | 4/1993 | Richard | A01N 1/02 62/441 |
| 2018/0042220 A1 | * | 2/2018 | Miyagawa | A01N 1/021 |

OTHER PUBLICATIONS

U.S. Appl. No. 62/942,830, filed Dec. 3, 2019. First Named Inventor: Herickhoff.

* cited by examiner

*Primary Examiner* — Michael L Hobbs
(74) *Attorney, Agent, or Firm* — Santangelo Law Offices, P.C.

(57) ABSTRACT

Embodiments of the present invention may provide effective processing of materials through phase transitions with a mobile phase transition device which may have a frozen storage area and a thawing area and which can be used to thaw biological materials near a recipient of the materials. A mobile phase transition device may be automated so that the thawing of materials can precisely follow thawing protocols.

18 Claims, 6 Drawing Sheets

SYSTEMS AND METHODS FOR AUTOMATING PHASE TRANSITIONS OF BIOLOGICAL MATERIALS

PRIORITY CLAIM

This is a U.S. Non-Provisional Patent Application claiming priority to and the benefit of U.S. Provisional Patent Application No. 62/942,830 filed Dec. 3, 2019, hereby incorporated by reference herein in its entirety.

BACKGROUND OF THE INVENTION

The phase transition of a material from a frozen state, for example, to a liquid state may cause significant physical changes to the material. These physical changes may be accompanied by changes in functionality of the material that is frozen. It is therefore of importance to manage phase transitions so as to minimize the difference between the pre-freeze-characteristics and the post-thaw-characteristics of the material undergoing phase transitions.

One non-limiting example may include the freezing and subsequent thawing of sperm cells. Here, sperm cells may be collected, diluted (at about 37° C.), cooled (to about 4° C.), frozen in perhaps liquid nitrogen (about −196° C.), warmed to about 37° C., and perhaps even diluted again before the cells may be used perhaps for insemination into female body. In this non-limiting example, cells may undergo several phase transitions where the cells, their associated membranes, and organelles can move from body temperature (about 37° C.) to perhaps about 4° C., −20° C., about −40° C., or even as low as about −196° C. then warmed again to about 37° C. In these transitions, an objective may be to maintain the cellular characteristics in such a state as they were when originally collected at about 37° C. However, motility may be reduced, DNA may be damaged, and perhaps even membranes may be physically changed to be more or less fluid after the phase transitions. Each of these, or perhaps all of these changes collectively, may cause changes in functionality.

One method to minimize damage associated with phase transitions may be to appropriately manage the change from the frozen state (about −20° C. to about −196° C.) to the body temperature state (about 37° C.). Thawing may occur at temperatures such as about 4° C. 17° C., about 37° C., about 50° C., or perhaps even as high as about 100° C. or any temperature. With each set temperature, the required time of incubation of the frozen material (the phase transition time) may vary. In some examples, at about 37° C., a straw may be exposed for about 1 minute to achieve a phase change, while at about 90° C., a sample may require exposure of only a few seconds before a transition to about 37° C. At higher temperatures, the exposure time may become more critical. That is, too long or too short of exposure time may cause irreversible damage to the cells perhaps rendering them ineffective because the phase transition was not managed appropriately.

Artificial insemination is widely used in livestock. For example, nearly 90% of dairy cows are artificially inseminated. Similarly, nearly all sows (female pigs) are artificially inseminated. In both of these cases, frozen straws are often utilized in environments that may be less than optimal and by people who may be more or less trained in the art of cellular transitions. Such environments may include a kitchen in a farm house, a room in a barn, a table in a barn, or even outside in a vehicle trunk, or the like. Each of these environments may result in a less than perfect phase transition. In addition, thawing straws away from the site of insemination may increase a potential for abuse of the straws such as but not limited to: improperly handling of the straws, unintentional and inadvertent temperature abuse, unnecessary extended time between thawing and insemination, and the like. Individually, and together, the effective 'abuse' of the straw of sperm can affect the quality of the sperm and hence, the chances of it creating a pregnancy.

In the swine industry, lowered fertility, smaller litter sizes, additional costs such as additional labor requirements, and even inconsistent results may have hampered the use of frozen-thawed sperm.

While today perhaps over 80% of the 6.3 million breeding sows are artificially inseminated (AI'd) and approximately 90% of AI'd virgin female pigs (gilts) are inseminated, it appears the majority (> about 85%) of breeding herds utilize cooled semen. Unfortunately, the limited life of cooled sperm may increase expenses, may result in insemination at suboptimal times, might require multiple inseminations per female, can result in disease transmission, may require excessive antibiotic use to suppress bacterial overgrowth, and may even attribute to a significant waste of sperm.

As mentioned, frozen-thawed semen offers a solution to these issues. At genetic nucleus farms reduction of disease transmission may occur through decreased frequency of semen deliveries to sow farms and perhaps allows time to confirm the absence of disease that perhaps resides in the semen (e.g., porcine reproductive and respiratory syndrome, "PRRS"). Frozen-thawed semen may offer a superior ability to synchronize with estrus and increase market reach, may provide a decreased requirement for antibiotics, and may even provide preservation of genetically superior sires perhaps for use beyond their productive life.

But frozen thawed sperm is currently used in swine on a limited basis (perhaps primarily for genetic preservation, some export, and some genetic line transfer) in part perhaps because frozen-thawed sperm currently requires a large sperm dose, offers sub-standard pigs/litter and can be technically difficult to handle. Unfortunately implementing a technical, rigorous method commercially may be beyond the expertise of sow farm employees.

The production of livestock is labor intensive and often involves conditions that are not amenable to, or congruent with, laboratory techniques that may optimize commercial results. Moreover, there are many situations that cannot be optimized or require compromises. Unfortunately, by changing the phase transitions of frozen materials in suboptimal conditions such as perhaps in a commercial setting, the quality of the post-thaw material is often compromised and may then be non-functional or sub-optimally functional perhaps resulting in poor pregnancy or low litter sizes, and perhaps even causing economic hardship.

A major component of frozen sperm success may be the speedy transition from frozen to thawed state and perhaps the delivery of sufficient number of healthy sperm to the oviductal reservoir. Boar sperm plasma membranes appear to be more fragile, less cryotolerant than other species, and more susceptible to oxidative and physical damage during the freezing and thawing process. If a dose of porcine semen contains between about 2.0 to about 4.0 billion cells, because sows are litter-bearing and because their reproductive tract can be proportionally large, a large number of functional sperm must be delivered to site of fertilization. If, for example, 70% of the cells are damaged in a dose of 2.0 billion cells, the sow would be inseminated with perhaps less than 0.6 billion cells which may impair litter sizes and overall fertility. While adding more sperm may seem to be a reasonable solution, it may not enable sufficient doses per ejaculate to be produced, and therefore may not be economically feasible on a commercial basis.

There is a need to efficiently manage phase transitions of materials and biological materials which can reduce damage to the materials and which can be used in environments that, in the past, was limited.

BRIEF SUMMARY OF THE INVENTION

The present invention includes a variety of aspects, which may be selected in different combinations based upon the particular application or needs to be addressed. In various embodiments, the invention may include systems and methods for automating materials through phase transitions as may be induced by cryopreservation or thawing or the like.

It is an object of the present invention in embodiments to provide material phase transitioning in a consistent, minimally damaging method perhaps via an automated or semi-automated system.

Another object of the present invention provides a system, method, and even equipment that can control the phase transition of materials, biological materials, cells, tissues, organs, and the like perhaps with respect to both time and temperature which may create an optimal phase transition and may minimize the quality differences between pre-freeze-materials and post-thaw-materials.

Yet another object of the present invention may maximize the conditions at which each product utilized in the phase transitions are held, handled and even maintained while enabling use in less-than-perfect environmental conditions which may address commercial challenges related to use of frozen products.

Naturally, further objects, goals and embodiments of the inventions are disclosed throughout other areas of the specification, claims, and drawings.

DETAILED DESCRIPTION OF THE INVENTION

It should be understood that the present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the present invention may include methods, systems, and even equipment for thawing materials, biological materials, sperm cells, stem cells, or the like in a way that can be self-contained, precise, optimizes characteristics of the phase transitioned materials, potentially enables improved use of materials requiring phase transition in non-optimized or even less-than-optimal environments, or the like.

In embodiments, the present invention may provide a system and method for transitioning materials, whether biological or inert, whether referring to materials surrounding the materials of use or the actual materials themselves, between different states. States may include frozen state, liquid state, gaseous state, freeze-dried state, plasma state or the like. In some embodiments, transition of phase states may be from a frozen state to a liquid state. A phase transition may proceed in a reverse direction or may move between states multiple times. In some embodiments, a transition may be in a step-wise manner, an accelerated manner, between states, perhaps skipping one state and proceeding to a third state such as frozen to gaseous or plasma state, or the like. Transition times and even temperatures may be modified which may enable a process or machine to be utilized for multiple, different applications within one piece of equipment.

The present invention, in embodiments, may provide a way to cause cooled, frozen, freeze-dried, or even warm products such as, but not limited to, sperm, oocytes, hepatocytes, stem cells, blood cells, recipient cells, tissues, cells or even non-biological materials, to undergo phase transitions such that they may go from a presumed inert or nearly inert, unusable, or perhaps even non-optimal status to a usable status, more optimal status in closer-to-optimal manner.

Embodiments of the present invention may provide systems and methods that can be used in close proximity to a recipient of the phase-transitioned materials, cells, tissues, or the like. A device may be portable perhaps by carrying, pulling, pushing, self-mobility such as with wheels, tracks, robotics, or the like enabling such proximity to recipient(s).

The present invention, in embodiments, may provide accurate and even preferred methods of phase transition perhaps as well as methods of in vitro holding prior to use. In some embodiments, systems may provide heating, warming or even cooling devices for solutions, materials, and biological samples, plus physical supplies and the like, which may be needed before, during, or after the phase transition.

Embodiments of the invention may provide a system which can deliver a phase transitioned material in a manner that it may be ready for immediate use and may not require further manipulation or manual changes, or the like.

Since it may be difficult to accurately determine precise estrus timing, control environmental temperature effects, and even with the inconsistencies associated with handling live animals, it may be necessary to provide an automated system which can optimally transition cells from one state to another temperature state, and even hold them in near-optimal condition until they can be utilized. Embodiments of the present invention may enable use in environments that are less than ideal for said phase transitions.

In embodiments, the present invention may provide a system and even method to move frozen products to a thawed state automatically, semi-automatically, or perhaps even manually in a manner that may closely match an optimal, experimentally determined, phase transition profile. This may be accomplished by having an automated arm, automated slide, or automated actuators that moves frozen material then holds the thawed material at the optimal condition.

In some embodiments, the present invention may provide a device having compartments that may be cooled or warmed and that may provide storage areas for materials to be used with phase-transitioned materials. As show in the non-limiting example of FIG. 1, a mobile phase transition device (1) perhaps optimized for livestock applications may include compartments (2). A device may include a storage area (3) for frozen products, frozen containers, frozen materials such as liquid nitrogen, or the like and even a phase-transition area (4). In some non-limiting embodiments, a phase-transitioning area may be a thawing area. A device may provide a media storage area (5); a media warming and dilution area (6); a post-thawing storage area (7) and perhaps even a supply storage and recording device area (8).

Figure 1:
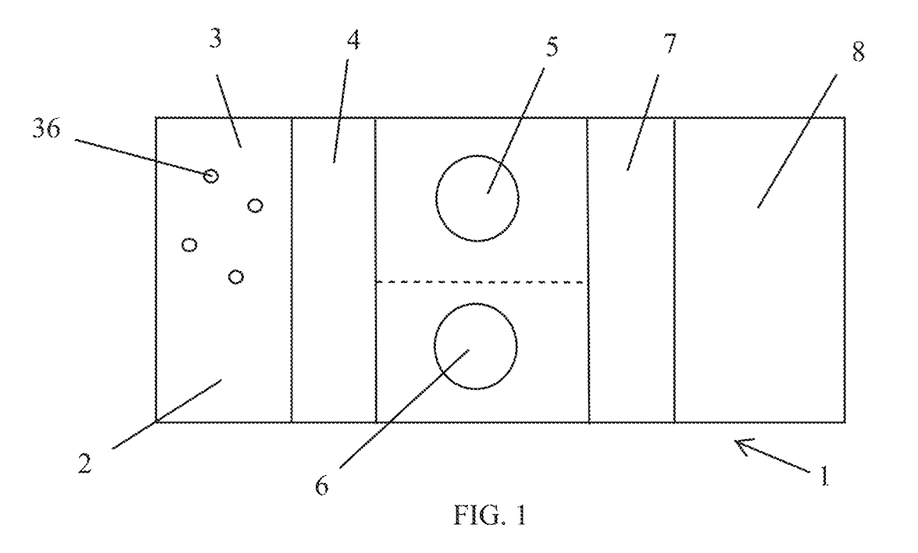
FIG. 1 shows a non-limiting example of a top-view of a phase transition machine in accordance with some embodiments of the present invention.
Figure 2:
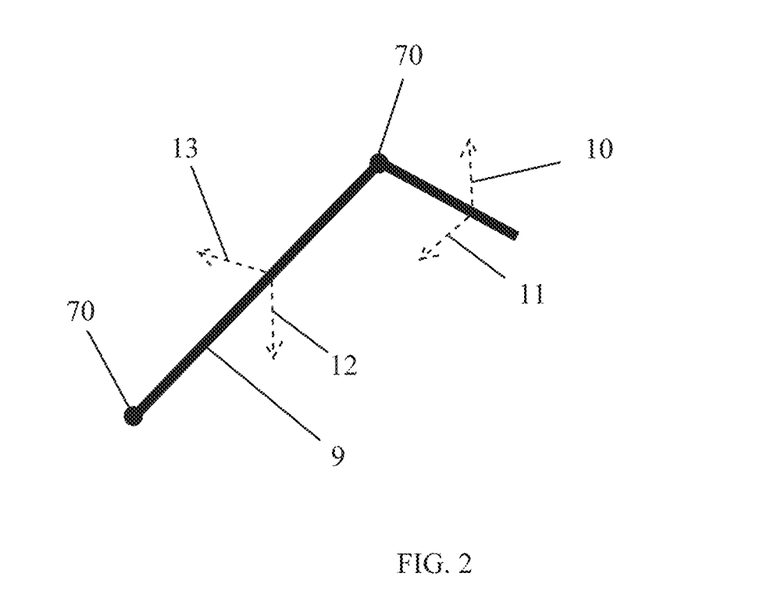
FIG. 2 shows a non-limiting example of a mechanism for physically moving materials through a phase transition in accordance with some embodiments of the present invention.

Frozen biological materials (36) may be stored in a container or may be contained in a frozen storage area of a mobile phase transition device. Frozen biological material may be automatically moved from a storage area and placed in a thawing area for a specific time and specific temperature that is above freezing so that it can thaw and precisely transition from a frozen state to a thawed state. Precise transitioning may include strict adherence to a thawing protocol which may only be accomplished in an automated system. A mobile phase transition device may be located, perhaps via manual or even automatic movement near a recipient (34) for the thawed biological material (37). The thawed biological material may be used with the recipient. Frozen biological material may include reproductive cells, sperm, oocytes, stem cells, or the like. Frozen biological material may be contained in a container such as a frozen straws of semen. A container may be anything that can contain a material such as a straw, tube, holder, and the like. Disclosure of a "straw" should be understood to encompass a straw of semen and also any other devices or equipment or other means of storing cryopreserved product such as a cryovial, a 0.5 ml straw, a 5 ml straw, an ampule, a pellet, and the like Materials may be moved through a phase transition device (1) manually or even automatically. A mechanical arm (9) or any type of mechanism may be used to move materials through phase transitions in a phase transition device. A may be understood in FIG. 2, an arm may have pivot points (70) and may be moveable in a variety of directions, planes, and the like (10, 11, 12, 13) perhaps to accomplish desired objectives of the system.

Figure 3:
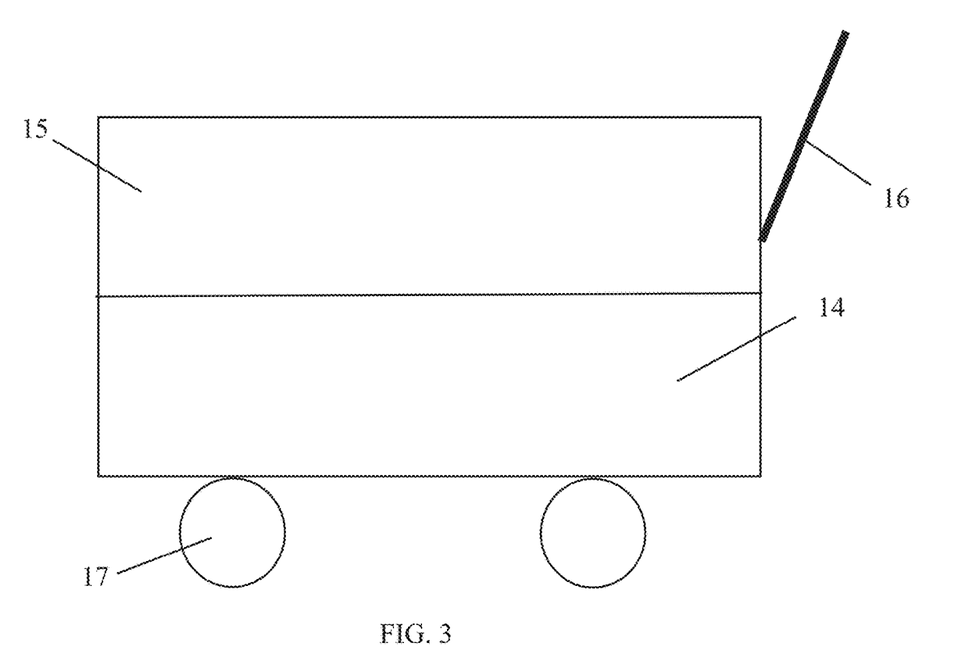
FIG. 3 shows a non-limiting example of a side-view of a phase transition machine in accordance with some embodiments of the present invention.

FIG. 3 shows a non-limiting example of a side view of a phase transition device (1) which may be used for livestock applications or the like. A device may include a propulsion trigger or device (16), a top portion (15) and even a utility storage area (14) which may store items such as a battery, heating and cooling units, electrical generator, wifi, computer units, or the like. A phase transition device may be mobile such as by incorporating wheels (17), a track, carrying arms, cable, battery powered motor, compressed air, or the like perhaps to assist with movement of the device.

Figure 4:
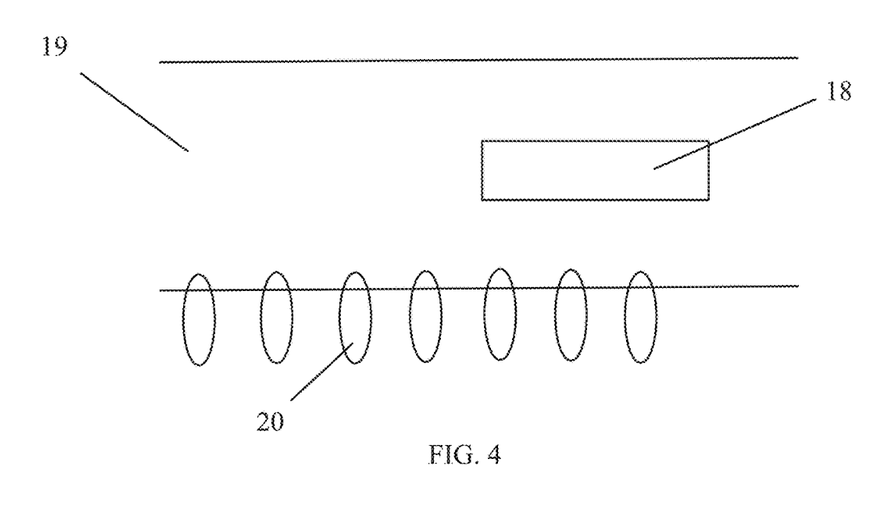
FIG. 4 shows a non-limiting example of a top view of a system with respect to livestock production in accordance with some embodiments of the present invention.

A phase transition device (18) may be used in livestock production such as represented in FIG. 4. A device (18) may need to fit within an aisleway (19) perhaps between rows of animals (20) and which may allow movement of personnel around, between, and among a device perhaps without endangering persons or animals or causing damage to the device.

Figure 5:
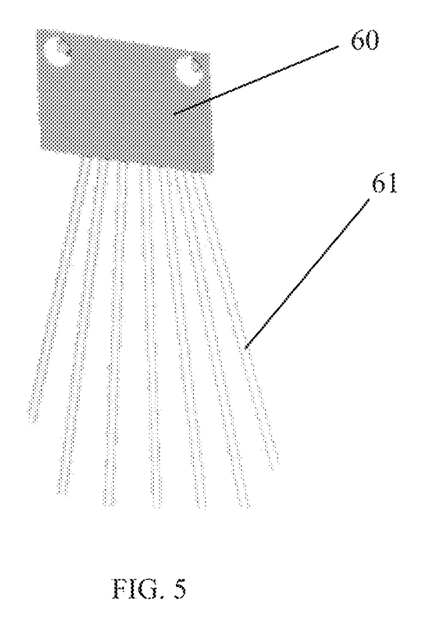
FIG. 5 shows a non-limiting example of front view of a device perhaps to hold, separate, and even transfer materials through a phase transition machine in accordance with some embodiments of the present invention.

As may be understood in FIG. 5, a device (60) may be used to extract, grab, grip, hold, separate, splay, release or the like to transfer materials (61) through a phase transition device. Materials (61) may be contained in tubes, straws, ampule, cryovial, other containers, or the like. A device (60) may be configured to grab, grip, splay, release or the like of multiple materials or even containers at a same time. A device (60) may be configured to appropriately space and separate multiple containers perhaps to enable thermodynamic continuity of materials within a device. Each container may need to be spaced apart so that when in a thawing area each container may be equally exposed to the thawing temperature and equally thawed. Through this or a related mechanism, materials may be removed from one phase such as perhaps liquid nitrogen, splayed for thermodynamic continuity within individual materials if perhaps multiple materials are being processed (61), then moved via a robotic arm, hydraulically, electronically, or perhaps pneumatically. A device may contact the materials for phase transition, it may be lined with, or coated with temperature resistant, or widely temperature tolerant materials such as perhaps phenyl silicone rubber, FKM, chlorosulphonated polyethene rubber or hydrogenated acrylonitrile-butadiene rubber or perhaps even ethylene-propylene-diene monomer. Such coating may be ribbed, or grooved to enable extraction from perhaps a liquid nitrogen environment, splaying or separating of the material (s), transferring to, and perhaps between, phase transition temperature treatments. A device may be adjustable, may contain a pressure sensitive feedback mechanism or the like perhaps to avoid damaging the material(s) being handled. Such transferring between phase states may be accomplished by a track or perhaps a conveyor made out of materials that can withstand the temperature requirements specific for the materials undergoing phase transition.

Figure 6:
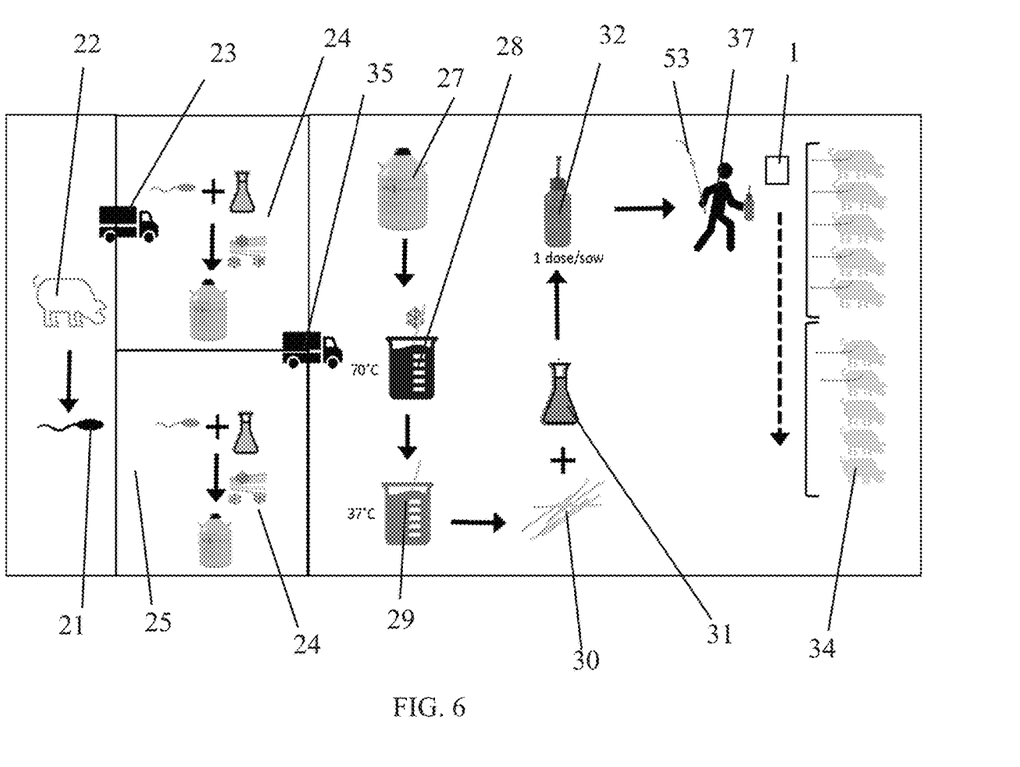
FIG. 6 shows a conceptual diagram of a non-limiting example of material processing in accordance with some embodiments of the present invention.

FIG. 6 provides a conceptual diagram of a non-limiting example of material processing. non-mechanized functionality of a phase transition device. Materials (21) may be collected from an animal (22). The materials may be transported (23) to a location to be processed or the materials may be processed at a same location (25) as the collection. One example of processing may include freezing the materials (24). The frozen materials may be transported to a different location (35) or they may remain at the same location. Frozen materials may undergo a phase transition, formed into a usable state (30, 31) aliquoted into an appropriate dose (32) then may be used by a technician (33) to administer via a mobile phase transition device (53) to a recipient (34). A phase transition may include (27, (28), (29). A usable state may include (30), (31) (31 plus 30), (32)

Figure 7:
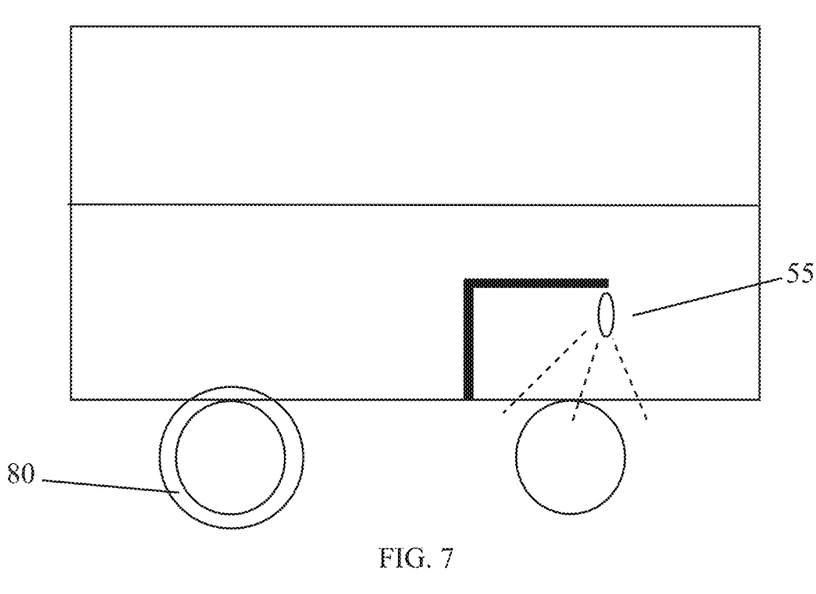
FIG. 7 shows a non-limiting example of a mechanism to prevent or limit disease transmission between places of use in accordance with some embodiments of the present invention.

Embodiments of the present invention may include limiting or even preventing disease transmission or contamination between places of use of a device. FIG. 7 shows an example of a phase transition device. Potentially contaminated portions of a device may be cleaned with a cleaner or disinfectant (55) such as by spraying or even treated with radiation, ultraviolet light, or the like. Protection from potential contamination may also include a protective layer that may be removed or perhaps replaced such as a plastic tube (80) that may enclose or encircle a mobile tract.

Figure 9:
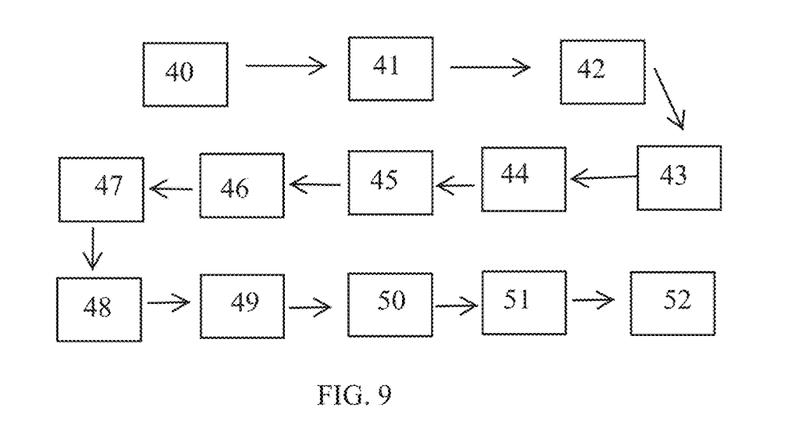
FIG. 9 shows a representation of various process steps in accordance with some embodiments of the present invention.

In embodiments, the present invention, may include steps such as: providing a mobile phase transition device having a frozen storage area and a thawing area (40); containing frozen straws of semen in liquid nitrogen in said frozen storage area of said mobile phase transition device (41); automatically moving said frozen straws of semen in said frozen storage area to said thawing area of said mobile phase transition device (42); automatically placing said frozen straws of semen in said thawing area of mobile phase transition device for a specific time and at a specific temperature that is above freezing (43); allowing said frozen straws of semen to phase transition from a frozen state to a thawed state in said thawing area to create thawed straws of semen in said mobile phase transition device (44); removing any associated liquid from phase transitioned materials or straws of semen (62), scanning data on said thawed straws (45); electronically recording said data (46); removing cotton plugs from said thawed straws (47); emptying contents of said thawed straw for insemination use (48); temporarily storing the contents of said thawed straw at a desired temperature (49); locating said mobile phase transition device among groups of animals in an insemination area and near recipients of said contents of said thawed straws (50); inseminating said recipients with said thawed semen (51); and perhaps cleaning said mobile phase transition device (52); or the like as represented in FIG. 9.

In some embodiments, the present invention may provide a device that may be robotically controlled and even executed. There may be an automatically controlled articulated arm or arms that can function to execute appropriate tasks such as movement of materials through phase transitions or even within areas where phase transitions may occur. The arms might be robotic or able to move with a remote means such as a joystick or other controller. Arms might include cartesian, rectilinear or gantry, SCARA, cylindrical, delta, polar or vertically articulated arms. Arms might include multiple axis. Arms might include spider-like robots built from jointed parallelograms, capable of delicate and precise movement. A movement device might also include tracts and actuators that effect movement of the materials. Such device might also include a method to separate, individualize, or otherwise space materials such that each individual material is appropriately exposed and evenly handled (FIG. 5) and perhaps to enable simultaneous processing of multiple samples.

A device may include transducers perhaps to sense positions and even a temperature of the various portions of the system within a phase-transition. Sensors may be attached to alarm systems that can indicate if one component of the system is not within given specifications. Sensors could be applied to either biological, physical, artificial barriers, or the like. A system may include LED, device fences, or the like such that it may not be able to move, in an automated or manual fashion beyond a specific parameter that can be manually or automatically set. A device may include a power source and could be electric, pneumatic, hydraulic or even hydroelectric perhaps to provide and even regulate energy.

In some embodiments, the present invention may provide a mobile device which may be portable or even propelled by wheels, tracks, magnetic levitation, air-suspension system to allow it to hover over obstacles, or the like. Movement of a device may be accomplished by a sliding type mechanism that can enable frictionless type movement. Portability may be accomplished by electronic means or even by manual means such as pushing, pulling or steering, or the like. A device may be electronically controlled either remotely or directly. There may be a propulsion system such as a source of mechanical power, and converting this source of power into a propulsive force. Technology systems to accomplish this may include but are not limited to wheels, axles, propellers, robotic legs, or perhaps even a magnetic levitation system, or a cable system. A device may be installed on a vehicle or other transportation, where tracks may allow the device to be positioned for use at a remote location and alternatively moved to a transportation mode so it may be again positioned for use.

In embodiments, an exterior or even an interior of a device and/or even specific parts of a device may be able to self-clean, or be cleaned or sanitized, perhaps such that wheels, and other areas that might move bio-contaminants from one area to another, can be eliminated. Techniques to accomplish this might include, but is not limited to, an ultraviolet radiation system, a reservoir of disinfectant, a hydrogen peroxide rinse system, a soap and water system, gas vapor sterilant, dry heat, wet heat, radiation sterilization, chemical sterilization, solvents, a method to physically cover areas of potential contamination, and remove or replace said cover, or the ability to remove, sterilize then replace said points of potential contamination, any combination thereof, or the like. Potentially contaminated portions might be sprayed or treated with radiation, ultraviolet light or the like.

A device may be self-controlled perhaps by sensors which may determine the proximity of obstacles such as animals, personnel, aisleways, or the like. A device may be able to electronically auto-navigate perhaps to sense the proximity to the person utilizing post-thaw materials as well as other obstacles. This may include, but is not limited to, infrared light sensors, physical bumper system with mechanical object sensors, camera systems, visual simultaneous localization, mapping algorithms, or the like. A system may use a gas sensing system (such as methane or methanethiol, carbon dioxide, or the like) perhaps to determine the location of biological hazards. A device may be pre-programmed or may be self-sensing perhaps to maintain spacing within any constraints of the system.

In embodiments, the present invention may provide segmenting of frozen materials perhaps so that fractions of a frozen material might be utilized. Similarly, and perhaps by the same method, a system may remove portions of phase-transition materials that may not be used in the next step. As but one non-limiting example, a system may remove the cotton plug from the end of a straw of thawed semen. This may be accomplished by a blade, scissors, a knife, or the like.

Portability of a device may be accomplished by a carrying handle, strap, an assisted carrying mechanism such as a temporary cart or the like.

A device may be compatible other technologies which may include liquid nitrogen tank, a drawer, or similar containers where pre-freeze items may be held for short-, long- or medium-term storage. A container or dewar may be temporarily stored in a device or may be permanent or even a semi-permanent portion of a system.

Embodiments of the present invention may provide a specialized method of storing vials of frozen products perhaps to make it possible to thaw multiple frozen product doses efficiently and simultaneously.

In embodiments, the present invention may provide a device with insulating properties perhaps to hold single or even multiple vessels, including but not limited to liquid nitrogen, liquid, beads, sand or other materials warmed to appropriate temperatures to thaw materials, or the like. A device may have areas that hold equipment at an appropriate temperature. Workflow may be optimized perhaps providing a method to prepare doses of thawed materials while a technician may be preparing the recipient for said doses. As but one non-limiting example, optimized processes may provide thawing samples of sperm while a technician may be utilizing an insemination device (53) such as inserting post-cervical artificial insemination ("PCAI") rods which may occur in industrial production lines. PCAI rods may be passed from a vagina into a cervix with varying difficulty and so generally an inseminator will start them on several sows (approximately 5, FIG. 6 (53, 37, 34), walking back and forth, working the rods, until they are able to lock into the cervix and passes the inner catheter into the uterus (which may require about 3-5 min/sow). An objective may be to finish insemination within a relatively short period of time after visual exposure of the sow to the boar (about 1 to about 2 hours). Ideally, during this time straws may be thawed and doses (e.g., multiple straws/dose) may be prepared.

A device, in some embodiments, may provide refrigeration or even freezing units, may have heating units, may have mechanisms to change the temperature of ancillary or associated liquids or even dry materials such as insemination rods, scissors, or the like. Batteries, solar panels, hot water heating or cooling may similarly be used to adjust the temperature of chambers, ancillary liquids, or dry materials. Systems may be rechargeable, may not require other attachments, may be freely mobile, and the like. Thermostats, or other methods to perhaps adjust the temperature of various chambers may be used to suit applications to multiple species or multiple technologies without limitation. Any electrical components of a device may function by a solar mechanism, a battery mechanism, an outside electrical source, adaptation to an outside electrical source, or the like.

Embodiments of the present invention may provide mechanisms for maintaining the temperature of materials before and even after phase transitions and/or during transportation between phase transitions. These may include, but are not limited to, insulated transition devices such as a thermos, an insulated carrying device, a pre-temperature adjusted device, or a temperature maintaining material, or dry wrapping, sand, metal beads or the like in an insulated or temperature adjusted container or the like.

Embodiments of the present invention may provide tracking of materials, the recipient, the situation, or the like. As but one non-limiting example, a sperm straw code printed on the side of a straw may be scanned or in some-way recorded, and the name, or number of the female animal, the time of insemination and any insemination notes, or the like may all be recorded. Recordation may include, but is not limited to, a visual voice recorder, a scanning device, a bar code scanner, a photographic method of recording, a computer keyboard, a selection device, or the like. A computer port may be used to download data into a main computer or it may be wirelessly transferred. Data may be transferred in such a way as to be compatible with existing data recording methodologies as may be used within the specific industries. Other embodiments may include software that allows input of the data prior to use, or at the time of use and allows selection of the insemination regime, records the time of use, and records information such as the name of the inseminator, or the like.

Embodiments of the present invention may provide mechanization to allow utilization of the most beneficial, but also most rigorous phase transition method. When considering the need for a rapid rate of thawing which may need to be precisely achieved (e.g., at about 1150° C./min, about 70° C. for about 8 seconds), one can understand the impact of a miscalculation or an additional few seconds of thawing on the health, functionality or feasibility of the phase-transitioned material. By removing sources of variation such as with automation, as but one non-limiting example, human fallibility, there may be enablement of elusive benefits of previously unattainable cell, tissue or sample states such as perhaps frozen-thawed sperm.

Freezing rates and thawing rates may need to mirror each other in order to optimize post-thaw results. However, when cells or tissues may be rapidly frozen, such as during vitrification, a freezing rate may be so rapid as to be nearly impossible to emulate by hand. Currently variable results may be obtained because of the difficulty of manually processing such rapid thawing protocols. The commercialization of protocols such as vitrification for freezing embryos may be hampered because it is currently impossible to emulate the rapid thawing in a production agriculture environment, especially but even in a laboratory environment with moderately skilled people. The embodiments of the present invention may enable such mirrored freezing and thawing (phase transitioning) rates.

In embodiments, the present invention may include visualization, or analysis of phase transitioned materials and even preservation of an aliquot of materials perhaps after a phase transition but prior to use. An aliquot may be useful for other analysis which may help enable prediction or even description of the functionality of the phase transitioned materials. Such data may be recorded and may be applied to the specific sample and even use the material.

A device may provide a thawing or warming phase transition perhaps including a liquid thawing bath, an area with conductive beads, an area containing metal warming slots, a size appropriate to the material being thawed, warm air or forced air mechanism, a solar mechanism to provide heat, a radiant heat, or radiation mechanism or some combination thereof, or the like.

EXAMPLES

Traditionally, survival rate of boar sperm after cryopreservation may be consistently lower in comparison with fresh sperm due to physical, chemical, and biological impairment as a consequence of the freezing and thawing process. It is well understood that sperm handling techniques should not negatively modify physiological characteristics of the sperm if the technique is to be successful. Unfortunately, cryopreservation and thawing may cause irreparable membrane damage, capacitation and capacitation-like changes as well as other sublethal changes. Much of the damage may result from membrane destabilization which render the sperm largely 'infertile' therefore decreasing the effective dose of sperm, possibly resulting in an insufficient number of sperm to achieve a large litter size. While capacitation may be required for fertilization of the oocyte, premature capacitation may render sperm incapable of fertilization. Collectively these changes may be reflected in reduced fertility (pregnancy per AI), higher pregnancy loss after AI and decreased litter sizes.

Routinely, frozen thawed boar sperm (perhaps even all sperm) may be thawed at about 37° C. for about 30 seconds but can be thawed at higher temperatures for shorter times followed by a stabilization period at about 37° C. When comparing thawing at about 37° C. for about 30 seconds with a higher temperature, for example, about 70° C. for about 8 seconds or about 80° C. for about 6 seconds, a warming temperature rate inside a straw was about 7-fold to about 12-fold faster. Sperm that is thawed rapidly have higher viability (e.g., improved motility, acrosome integrity, mitochondrial membrane potential and in vitro oocyte penetrability). An effect of rapid thawing (about 1800° C./min to transition from about −196° C. to about 37° C.) had a positive linear correlation with sperm health parameters. This thawing rate more closely mirror the freezing rate and therefore perhaps results in improved health parameters.

Figure 8:
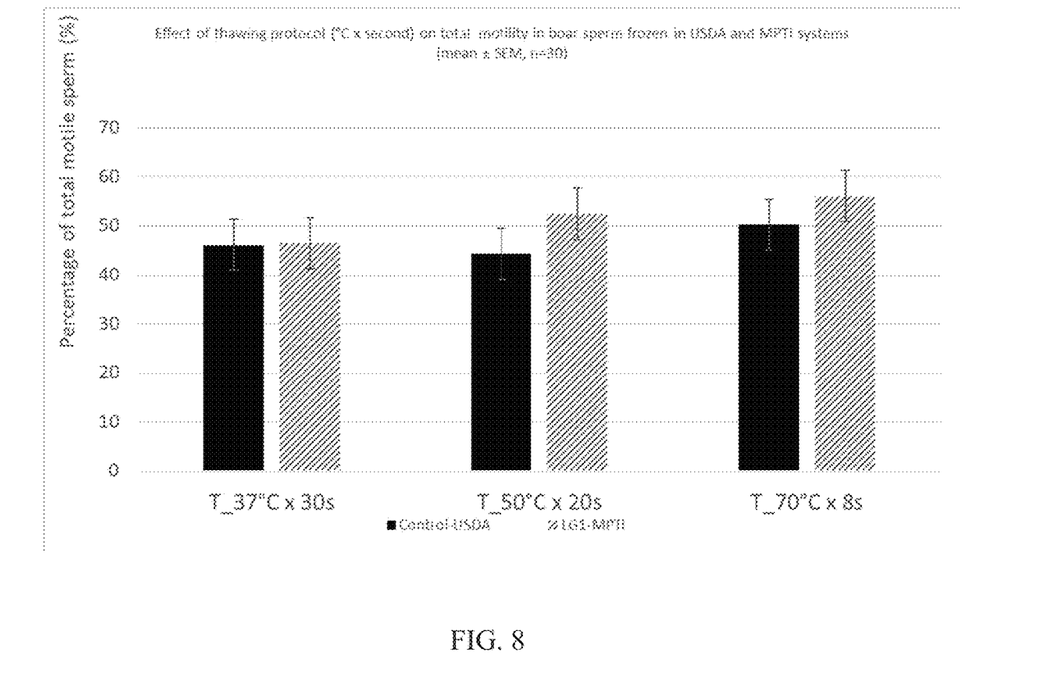
FIG. 8 shows a graph with the effect of thawing protocol on total motility in boar sperm frozen using two different types of extenders in accordance with some embodiments of the present invention.

Thawing sperm in a high temperature, rapid system showed an improved number of sperm available to fertilize an oocyte by up to about 15% (sperm that has acrosome and membrane intact multiplied by percent of motile sperm) compared to control (data not shown, P<0.01). In studies thawing at about 70° C. for about 8 seconds (e.g., thawing rate of about 1150° C./min) resulted in sperm with significantly higher motility and kinematic parameters when compared to sperm thawed about 37° C. for about 30 seconds (rate of about 630° C./min), and similar to frozen sperm thawed at about 50° C. for about 20 seconds (rate of about 980° C./min). A positive linear improvement of sperm parameters was seen in thawing protocols with higher temperatures. Sperm that are thawed at higher temperature rates may pass through the damaging phase of ice nucleation (about −15° C. to about −5° C.) and cold shock (about <5° C.) phases quicker and may undergo less cryodamage resulting in higher post-thaw sperm survival and health. At the same time, with such a rapid thawing rate (about <1000° C./min), it can be understood how human timing errors may have major consequences on sperm health. FIG. 8 provides the percentage of motile sperm using two different types of extenders A (control-U.S.DA) and B (LG1-MPTI) and the effects of the thawing protocol. Regardless of extender, the impact of thawing rate (time and temperature) is evident on post-thaw sperm health.

As can be easily understood from the foregoing, the basic concepts of the present invention may be embodied in a variety of ways. It involves both mobile phase transitioning techniques as well as devices and automated mechanisms to accomplish the appropriate mobile phase transitioning device. In this application, the mobile phase transitioning techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "thawer" should be understood to encompass disclosure of the act of "thawing"—whether explicitly discussed or not—and, conversely, were there effectively disclosure of the act of "thawing", such a disclosure should be understood to encompass disclosure of a "thawer" and even a "means for thawing." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components that are configured to, or configured and arranged to, achieve a particular result, use, purpose, situation, function, or operation, or as components that are capable of achieving a particular result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the mobile phase transitioning devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

In addition and as to computer aspects and each aspect amenable to programming or other electronic automation, it should be understood that in characterizing these and all other aspects of the invention—whether characterized as a device, a capability, an element, or otherwise, because all of these can be implemented via software, hardware, or even firmware structures as set up for a general purpose computer, a programmed chip or chipset, an ASIC, application specific controller, subroutine, or other known programmable or circuit specific structure—it should be understood that all such aspects are at least defined by structures including, as person of ordinary skill in the art would well recognize: hardware circuitry, firmware, programmed application specific components, and even a general purpose computer programmed to accomplish the identified aspect. For such items implemented by programmable features, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi) circuitry configurations (including configurations of transistors, gates, and the like) that act to sequence and/or cause actions as detailed, xxvii) computer readable medium(s) storing instructions to execute the steps and cause activities detailed, xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent inventions, and xxxiii) the various combinations of each of the above and of any aspect, all without limiting other aspects in addition.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 U.S.C 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for effectively processing materials through phase transitions comprising the steps of:
   rapidly freezing biological material to create frozen biological material;
   providing a mobile phase transition device having a frozen storage area and a thawing area;
   containing said frozen biological material in said frozen storage area of said mobile phase transition device;
   automatically moving said frozen biological material in said frozen storage area to said thawing area of said mobile phase transition device;
   rapidly thawing said frozen biological material in said thawing area by automatically placing said frozen biological material in a water bath at greater than 50° C. for up to 8 seconds;
   locating said mobile phase transition device near a recipient of said thawed biological material; and
   utilizing said thawed biological material with said recipient.

2. The method as described in claim 1 wherein said frozen biological material is chosen from reproductive cells, sperm, oocytes, and stem cells.

3. The method as described in claim 1 wherein said step of rapidly freezing said biological material comprises vitrifying said biological material.

4. The method as described in claim 1 wherein said step of rapidly thawing said frozen biological material comprises a step of automatically placing said frozen biological material in a water bath at 70° C. for 8 seconds.

5. The method as described in claim 4 and further comprising the steps of:
automatically removing said biological material from said water bath;
automatically placing said biological material in a 37° C. water bath until ready to be used.

6. The method as described in claim 1 wherein said step of rapidly thawing said frozen biological material comprises a step of automatically placing said frozen biological material in a water bath at 80° C. for about 6 seconds.

7. The method as described in claim 1 wherein said step of providing a mobile phase transition device having a frozen storage area and a thawing area comprises the step of providing a mobile phase transition device having a frozen storage area, a thawing area, and a warming area.

8. A method for effectively processing materials through phase transitions comprising the steps of:
providing a mobile phase transition device having a frozen storage area and a thawing area;
containing containers of frozen semen in liquid nitrogen in said frozen storage area of said mobile phase transition device;
automatically moving said containers of frozen semen in said frozen storage area to said thawing area of said mobile phase transition device;
rapidly thawing said containers of frozen semen in said thawing area by automatically placing said frozen biological material in a water bath at greater than 50° C. for up to 8 seconds;
allowing said containers of frozen semen to transfer from a frozen state to a thawed state in said thawing area to create containers of thawed semen in said mobile phase transition device;
removing said containers of said thawed semen from said thawing area;
scanning data on said containers of said thawed semen;
electronically recording said data;
removing closure devices from said containers of said thawed semen;
emptying contents of said containers of said thawed semen for insemination use;
temporarily storing the contents of said containers of said thawed semen at a desired temperature;
locating said mobile phase transition device among groups of animals in an insemination area and near recipients of said contents of said thawed containers;
inseminating said recipients with said thawed semen; and
cleaning said mobile phase transition device.

9. The method as described in claim 8 wherein said step of cleaning said mobile phase transition device comprises a step of sanitizing said mobile phase transition device.

10. The method as described in claim 8 wherein said steps of automatically moving said containers to said thawing area and allowing said containers of frozen semen to transfer from a frozen state to a thawed state in said thawing area to create containers of thawed semen in said mobile phase transition device comprises the steps of:
grasping a predetermined number of said containers of frozen semen in liquid nitrogen in said frozen storage area with an automated arm;
automatically moving said containers of frozen semen into said thawing area with said automated arm;
automatically holding said containers of frozen semen in a water bath at 70° C. for 8 seconds in said thawing area with said automated arm; and
removing said containers of thawed semen with said automated arm.

11. The method as described in claim 8 wherein said step of rapidly thawing said containers of frozen semen in said thawing area comprises a step chosen from:
thawing said frozen containers in a water bath at about 80° C. for about 6 seconds; and
thawing said frozen containers in a water bath at about 70° C. for about 8 seconds.

12. The method as described in claim 8 and further comprising a step of drying said containers of said thawed semen after said step of removing said containers of said thawed semen from said thawing area.

13. The method as described in claim 8 wherein said step of emptying said contents of said containers of said thawed semen for insemination use comprises a step of placing said containers over an open insemination device and emptying said contents of said containers into said device for about 10 seconds.

14. The method as described in claim 13 and further comprising the step of heating an insemination device in a compartment of said mobile phase transition device.

15. The method as described in claim 8 wherein said step of electronically recording said data comprises the steps of:
reading information located on said containers;
storing said information; and
electronically transmitting said information to an off-site data center for storage and use.

16. The method as described in claim 8 wherein said step of locating said mobile phase transition device among groups of animals in said insemination area and near recipients of said contents of said thawed containers comprises a step of manually or automatically moving said mobile phase transition device.

17. The method as described in claim 8 and further comprising the steps of:
providing a device configured to grab, grip, splay, and release multiple containers at the same time and configured to appropriately space and separate said multiple containers to enable thermodynamic continuity of said materials within said mobile phase transition device;
grabbing multiple of said containers of said frozen semen with said device;
gripping said multiple containers at the same time with said device during said step of automatically moving said containers of frozen semen in said frozen storage area to said thawing area of said mobile phase transition device; and
releasing said multiple containers from said device.

18. The method as described in claim 8 wherein said step of providing a mobile phase transition device having a frozen storage area and a thawing area comprises the step of providing a mobile phase transition device having a frozen storage area, a thawing area, and a warming area.

* * * * *